UNITED STATES PATENT OFFICE.

DAMON R. AVERILL, OF PULASKI, NEW YORK, ASSIGNOR TO HIMSELF AND JAMES F. DAVIS, OF SAME PLACE.

IMPROVEMENT IN COMPOSITION FOR VARNISHES.

Specification forming part of Letters Patent No. 19,729, dated March 23, 1858.

*To all whom it may concern:*

Be it known that I, DAMON R. AVERILL, of Pulaski, in the county of Oswego and State of New York, have invented an Improvement in Varnish, the construction and operation of which I have described in the following specification and with sufficient clearness to enable competent and skillful workmen in the arts to which it pertains or is most nearly allied to make and use my invention.

My said invention consists in the combination of water with acetate or other preparation of lead containing oxygen with a turpentine and coal-tar varnish, as hereinafter described, by which the varnish is rendered more adhesive, quicker drying, and harder when dry.

This varnish is made of the ingredients and in the manner described below—that is to say, I first boil two quarts of soft water in an open dish with three ounces of saleratus and three ounces of shellac till the shellac is fully dissolved. I then boil or simmer in an iron pot one gallon of coal-tar, and add two ounces sugar of lead, two ounces red lead, and two ounces litharge, each previously ground in a little spirits of turpentine, and shortly after add four ounces of rosin in fine powder. These ingredients I boil together one hour. I then remove the kettle from the fire and add two quarts of spirits of turpentine, and mix it in thoroughly by stirring. I then add the water, gum-shellac, and saleratus previously prepared as above, taking care to incorporate the whole thoroughly by stirring, and the varnish is ready to be strained and set away for use.

This varnish is very useful as a cheap varnish for iron work, and the rapidity with which it dries is a very important recommendation in its favor. The action of the water and lead and their combined effect upon the other ingredients produce a rapidly-drying varnish from materials which would otherwise be slow to become hard, and makes a better varnish at a cheaper rate, as it saves the expense of the excess of spirits of turpentine, which would otherwise be necessary.

What I claim is—

The above-described composition of matter, consisting of water and acetate of lead with spirits of turpentine and coal-tar, for the purpose of making a cheap, quickly-drying, and superior varnish, substantially as set forth.

D. R. AVERILL.

Witnesses:
J. B. WATSON,
J. M. WATSON.